(12) United States Patent
Baio et al.

(10) Patent No.: US 8,599,801 B2
(45) Date of Patent: Dec. 3, 2013

(54) COLLECTING IMPLICIT INFORMATION FOR DETERMINING CONTEXT OF EVENT ACTIONS

(75) Inventors: Andrew Baio, Palo Alto, CA (US); Daniel James Wascovich, San Francisco, CA (US); Edward Ho, San Jose, CA (US); Edward Stanley Ott, IV, Palo Alto, CA (US); Gordon David Luk, Jr., Sunnyvale, CA (US); Nathanael Joe Hayashi, Piedmont, CA (US); Jonathan James Trevor, Santa Clara, CA (US); Leonard Lin, Palo Alto, CA (US); Matthew Fukuda, San Francisco, CA (US); Michael Quoc, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1022 days.

(21) Appl. No.: 11/670,400

(22) Filed: Feb. 1, 2007

(65) Prior Publication Data

US 2008/0186926 A1    Aug. 7, 2008

(51) Int. Cl.
*H04W 4/00* (2006.01)
(52) U.S. Cl.
USPC ........... 370/338; 370/312; 370/352; 455/466; 455/519
(58) Field of Classification Search
USPC ........................................................ 715/753
See application file for complete search history.

(56) References Cited

U.S. PATENT DOCUMENTS

| 5,333,317 A | 7/1994 | Dann |
| 5,923,848 A | 7/1999 | Goodhand et al. |
| 6,201,814 B1 | 3/2001 | Greenspan |
| 6,208,339 B1 | 3/2001 | Atlas et al. |
| 6,247,043 B1 | 6/2001 | Bates et al. |
| 6,269,369 B1 | 7/2001 | Robertson |
| 6,377,965 B1 | 4/2002 | Hachamovitch et al. |
| 6,421,672 B1 | 7/2002 | McAllister et al. |

(Continued)

FOREIGN PATENT DOCUMENTS

| JP | 2004126739 A | 4/2004 |
| KR | 10-0564310 B1 | 3/2006 |
| WO | 2004095806 A2 | 11/2004 |
| WO | WO-2005/114970 A2 | 12/2005 |

OTHER PUBLICATIONS

International Search Report and Written Opinion for International Applicaion No. PCT/US2008?050234, mailed on Apr. 23, 2008, 9 pages.

(Continued)

*Primary Examiner* — David Q Nguyen

(57) ABSTRACT

A device, system, and method are directed towards determining a start and/or an end time for a spontaneous event. A mobile device user creates a group for the spontaneous event, and sends the members an invite. During the event, members share media content and/or text messages with other members. Based, in part, on a flow of media content and/or text messages between the members, a determination of a start time and/or end time of the spontaneous event is automatically performed. The start time may be based on when the group is created and/or revised when a flow rate of the media content and/or messages exceed a threshold. The end time may be based on the flow rate being less than another threshold. The location of the spontaneous event may also be determined based on a location of the member's mobile devices during the event.

21 Claims, 7 Drawing Sheets

(56) References Cited

U.S. PATENT DOCUMENTS

| | | | |
|---|---|---|---|
| 6,557,004 B1 | 4/2003 | Ben-Shachar et al. | |
| 6,775,689 B1 | 8/2004 | Raghunandan | |
| 6,829,607 B1 | 12/2004 | Tafoya et al. | |
| 6,832,245 B1 | 12/2004 | Isaacs et al. | |
| 6,901,436 B1 | 5/2005 | Schneider | |
| 6,952,805 B1 | 10/2005 | Tafoya et al. | |
| 6,996,413 B2 | 2/2006 | Inselberg | |
| 7,010,572 B1 | 3/2006 | Benjamin et al. | |
| 7,047,030 B2* | 5/2006 | Forsyth | 455/518 |
| 7,103,379 B2 | 9/2006 | Hilerio | |
| 7,111,044 B2* | 9/2006 | Lee | 709/204 |
| 7,149,780 B2 | 12/2006 | Quine et al. | |
| 7,162,474 B1 | 1/2007 | Harker et al. | |
| 7,184,790 B2* | 2/2007 | Dorenbosch et al. | 455/519 |
| 7,240,298 B2 | 7/2007 | Grossman et al. | |
| 7,248,888 B2 | 7/2007 | Inselberg | |
| 7,249,123 B2 | 7/2007 | Elder et al. | |
| 7,313,760 B2 | 12/2007 | Grossman et al. | |
| 7,319,882 B2* | 1/2008 | Mendiola et al. | 455/466 |
| 7,360,174 B2 | 4/2008 | Grossman et al. | |
| 7,366,759 B2 | 4/2008 | Trevithick et al. | |
| 7,418,663 B2 | 8/2008 | Pettinati et al. | |
| 7,430,719 B2 | 9/2008 | Pettinati et al. | |
| 7,444,351 B1 | 10/2008 | Nomiyama | |
| 7,472,110 B2 | 12/2008 | Achlioptas | |
| 7,512,654 B2 | 3/2009 | Tafoya et al. | |
| 7,516,411 B2* | 4/2009 | Beaton et al. | 715/753 |
| 7,543,026 B2 | 6/2009 | Quine et al. | |
| 7,543,243 B2 | 6/2009 | Schwartz et al. | |
| 7,577,665 B2 | 8/2009 | Ramer et al. | |
| 7,580,363 B2 | 8/2009 | Sorvari et al. | |
| 7,596,555 B2 | 9/2009 | Klein | |
| 7,620,387 B2 | 11/2009 | Rybak | |
| 7,631,266 B2 | 12/2009 | Werndorfer et al. | |
| 7,634,741 B2 | 12/2009 | Klein | |
| 7,636,719 B2 | 12/2009 | Thompson et al. | |
| 7,639,634 B2 | 12/2009 | Shaffer et al. | |
| 7,680,770 B1 | 3/2010 | Buyukkokten et al. | |
| 7,684,815 B2 | 3/2010 | Counts et al. | |
| 7,725,523 B2 | 5/2010 | Bolnick et al. | |
| 7,865,206 B2 | 1/2011 | Quoc et al. | |
| 7,873,639 B2 | 1/2011 | Shipman | |
| 8,006,190 B2 | 8/2011 | Quoc et al. | |
| 8,200,763 B2 | 6/2012 | Quoc et al. | |
| 2001/0031632 A1 | 10/2001 | Benz et al. | |
| 2002/0023230 A1 | 2/2002 | Bolnick et al. | |
| 2002/0073163 A1 | 6/2002 | Churchill et al. | |
| 2002/0091773 A1 | 7/2002 | Chowdhry et al. | |
| 2002/0128001 A1 | 9/2002 | Shuttleworth | |
| 2003/0153341 A1* | 8/2003 | Crockett et al. | 455/519 |
| 2003/0212680 A1 | 11/2003 | Bates et al. | |
| 2004/0001446 A1* | 1/2004 | Bhatia et al. | 370/261 |
| 2004/0034591 A1 | 2/2004 | Waelbroeck et al. | |
| 2004/0034723 A1 | 2/2004 | Giroti | |
| 2004/0119760 A1 | 6/2004 | Grossman et al. | |
| 2004/0135816 A1 | 7/2004 | Schwartz et al. | |
| 2004/0137882 A1* | 7/2004 | Forsyth | 455/414.1 |
| 2004/0167966 A1 | 8/2004 | Lee et al. | |
| 2004/0199580 A1* | 10/2004 | Zhakov et al. | 709/204 |
| 2004/0210844 A1 | 10/2004 | Pettinati et al. | |
| 2004/0219936 A1 | 11/2004 | Kontiainen | |
| 2005/0021624 A1* | 1/2005 | Herf et al. | 709/204 |
| 2005/0034079 A1* | 2/2005 | Gunasekar et al. | 715/753 |
| 2005/0038876 A1 | 2/2005 | Chaudhuri | |
| 2005/0076013 A1 | 4/2005 | Hilbert et al. | |
| 2005/0081059 A1 | 4/2005 | Bandini et al. | |
| 2005/0143106 A1* | 6/2005 | Chan et al. | 455/466 |
| 2005/0164725 A1 | 7/2005 | Naito et al. | |
| 2005/0174975 A1 | 8/2005 | Mgrdechian et al. | |
| 2005/0177385 A1 | 8/2005 | Hull et al. | |
| 2005/0209914 A1 | 9/2005 | Nguyen et al. | |
| 2005/0212659 A1 | 9/2005 | Sauer | |
| 2005/0216848 A1* | 9/2005 | Thompson et al. | 715/753 |
| 2005/0267940 A1 | 12/2005 | Galbreath et al. | |
| 2006/0010104 A1 | 1/2006 | Pettinati et al. | |
| 2006/0026535 A1 | 2/2006 | Hotelling et al. | |
| 2006/0059123 A1 | 3/2006 | Klein | |
| 2006/0067250 A1* | 3/2006 | Boyer et al. | 370/260 |
| 2006/0068818 A1* | 3/2006 | Leitersdorf et al. | 455/466 |
| 2006/0111135 A1 | 5/2006 | Gray et al. | |
| 2006/0123082 A1* | 6/2006 | Digate et al. | 709/205 |
| 2006/0195531 A1 | 8/2006 | Braun et al. | |
| 2006/0240856 A1 | 10/2006 | Counts et al. | |
| 2006/0242234 A1 | 10/2006 | Counts et al. | |
| 2006/0250975 A1 | 11/2006 | Grech et al. | |
| 2006/0270419 A1 | 11/2006 | Crowley et al. | |
| 2007/0022003 A1 | 1/2007 | Chao et al. | |
| 2007/0032267 A1 | 2/2007 | Haitani et al. | |
| 2007/0047697 A1 | 3/2007 | Drewry et al. | |
| 2007/0049344 A1 | 3/2007 | Van Der Velde et al. | |
| 2007/0067285 A1 | 3/2007 | Blume et al. | |
| 2007/0073663 A1 | 3/2007 | McVeigh et al. | |
| 2007/0152978 A1 | 7/2007 | Kocienda et al. | |
| 2007/0197247 A1 | 8/2007 | Inselberg | |
| 2007/0233656 A1 | 10/2007 | Bunescu et al. | |
| 2007/0233681 A1 | 10/2007 | Ronen et al. | |
| 2007/0255807 A1 | 11/2007 | Hayashi et al. | |
| 2007/0264980 A1 | 11/2007 | Richardson et al. | |
| 2007/0276846 A1 | 11/2007 | Ramanathan et al. | |
| 2008/0045236 A1 | 2/2008 | Nahon et al. | |
| 2008/0071867 A1 | 3/2008 | Pearson et al. | |
| 2008/0120410 A1 | 5/2008 | Quoc et al. | |
| 2008/0208812 A1 | 8/2008 | Quoc et al. | |
| 2008/0280637 A1 | 11/2008 | Shaffer et al. | |
| 2011/0072125 A1 | 3/2011 | Quoc et al. | |
| 2011/0302263 A1 | 12/2011 | Quoc et al. | |

OTHER PUBLICATIONS

Federated search, http://en.wikipedia.org/wiki/Federated_search (last visited May 15, 2007) (3 pages).

Crowley, Dennis P. et al., U.S. Appl. No. 60/570,410, filed May 12, 2004 entitled "Location-Based Social Software for Mobile Devices", (18 pages).

Office Communication for U.S. Appl. No. 11/562,827, mailed on Jun. 17, 2009. (31 pgs).

Office Letter, Taiwan Patent Application No. 97100810, issued Sep. 6, 2011.

International Preliminary Report on Patentability for International Patent Application No. PCT/US2008/050234 mailed Aug. 13, 2009.

Official Communication for U.S. Appl. No. 11/562,827 mailed Jul. 20, 2010.

Official Communication for U.S. Appl. No. 11/562,827 mailed Feb. 1, 2011.

Official Communication for U.S. Appl. No. 11/562,827 mailed Dec. 8, 2011.

Official Communication for U.S. Appl. No. 11/562,827 mailed Jun. 17, 2009.

Official Communication for Chinese Patent Application No. 200780048985.3 mailed Aug. 25, 2010.

Official Communication for Chinese Patent Application No. 200780048985.3 mailed Dec. 26, 2011.

Official Communication for Korean Patent Application No. 10-2009-701142 mailed Jan. 13, 2011.

Diehl, C. P. et al., "Name Reference Resolution in Organizational Email Archives," Proceedings of the Sixth SIAM International Conference on Data Mining, Apr. 20-22, 2006; Bethesda, MD.

Malin, B. et al., "A Network Analysis Model for Disambiguaton of Names in Lists," Computatonal & Mathematical Organziation Theory, vol. 11, No. 2, Jul. 2005, pp. 119-139.

Yang, K.-H. et al., "Web Appearance Disambiguation of Personal Names Based on Network Motif," Proceedings of the 2006 IEEE/WIC/ACM International Conference on Web Intelligence, Dec. 18-22, 2006, pp. 386-369.

"Yahoo! Users Can Now Search and Send Email with Four11 Directory," PR Newswire, Apr. 10, 1996, p. 410SFW007.

Bekkerman, R. et al., "Disambiguating Web Appearances of People in a Social Network" Proceedings of the 14th International Conference on World Wide Web, May 10-14, 2005, Chiba, Japan.

(56) References Cited

OTHER PUBLICATIONS

Culotta, A. et al., "Extracting Social Networks and Contact Information from Email and the Web," Department of Computer Science, University of Massachusetts, Amherst, MA, 2004; retrieved from http://www2.selu.edu/Academics/Faculty/aculotta/pubs/culotta04extracting.pdf.

Hölzer, R. et al., "Email Alias Detection Using Social Network Analysis," Proceedings of the 3rd International Workshop on Link Discovery, Aug. 21-25, 2005, pp. 52-57, Chicago, Illinois.

Bollegala, D. et al., "Extracting Key Phrases to Disambiguate Personal Names on the Web," Proceedings of the CICLing 2006, 2006, Mexico City, Mexico.

"Disambiguation of Intended E-mail recipients by Contextual Analysis of E-mail Subject and Body Text," IBM Technical Disclosure Bulletin, No. 450, UK, Oct. 2001, p. 1749, TDB-ACC-No. NNRD450111.

"Ambiguity Memory," IBM Technical Disclosure Bulletin, vol. 36, No. 8, Aug. 1993, US, pp. 229-230; TDB-ACC-No. NN9308229.

"Friendster for Your Mobile Phone," Trandcentral, Apr. 19, 2004, 1 page.

"Circle Line: Let your Cell Phone Keep Tabs on Your Friends," Dodgeball.com—Originally published in Time Out NY, No. 247, Dec. 4-11, 2003, pp. 174-175.

"So Happy Together," Dodgeball.com—Originally published in Newsweek, May 10, 2004, pp. 12-13.

"Dodgeball Goes Multi-City," Corante: Tech News. Filtered Daily.; Many2Many: A Group Weblog on Social Software, Apr. 17, 2004, 1 page.

International Search Report and Written Opinion for International Patent Application No. PCT/US2007/071204 dated Dec. 7, 2007.

Official Communication and Search Report for European Patent Application No. 07798558.8 mailed Nov. 18, 2010.

Official Communication for U.S. Appl. No. 11/555,247 mailed Jun. 7, 2010.

Official Communication for U.S. Appl. No. 11/555,247 mailed Oct. 28, 2010.

Official Communication for U.S. Appl. No. 11/555,247 mailed Jan. 4, 2011.

Official Communication for U.S. Appl. No. 11/555,247 mailed Apr. 12, 2011.

Official Communication for U.S. Appl. No. 11/688,749 mailed Aug. 27, 2009.

Official Communication for U.S. Appl. No. 11/688,749 mailed May 18, 2010.

Official Communication for U.S. Appl. No. 11/688,749 mailed Jul. 13, 2010.

Official Communication for U.S. Appl. No. 11/688,749 mailed Aug. 30, 2010.

Official Communication for U.S. Appl. No. 12/955,771 mailed Jul. 21, 2011.

Official Communication for U.S. Appl. No. 11/712,855 mailed May 12, 2009.

Official Communication for U.S. Appl. No. 11/712,855 mailed Nov. 18, 2009.

Official Communication for U.S. Appl. No. 11/712,855 mailed Feb. 2, 2010.

Official Communication for U.S. Appl. No. 11/712,855 mailed Mar. 23, 2010.

Official Communication for U.S. Appl. No. 11/712,855 mailed Aug. 30, 2010.

Official Communication for U.S. Appl. No. 11/712,855 mailed Nov. 9, 2010.

Official Communication for U.S. Appl. No. 11/712,855 mailed Jan. 24, 2012.

Official Communication for U.S. Appl. No. 11/712,855 mailed Jul. 26, 2012.

Official Communication for U.S. Appl. No. 11/562,827 mailed Feb. 16, 2012.

U.S. Appl. No. 11/562,827 Non-Final Office Action, mailed Jan. 6, 2010, 34 pages.

Event Definition from the Merriam-Webster Online Dictionary, accessed Jan. 2, 2010, 2 pages <http://m-w.com/dictionary/event>.

Event from the American Heritage Dictionary of the English Language, CREDO reference, accessed Jan. 2, 2010, 2 pages <http://www.credoreference.com/entry/hmdictenglang/event>.

Hakkila, J. et al., "User Experiences on Combining Location Sensitive Mobile Phone Applications and Multimedia Messaging," In Proceedings of the 3rd International Conference on Mobile and Ubiquitous Multimedia, College Park, Maryland, Oct. 27-29, 2004, MUM 2004, vol. 83 ACM, New York, NY, 179-185.

* cited by examiner

COLLECTING IMPLICIT INFORMATION FOR DETERMINING CONTEXT OF EVENT ACTIONS

FIELD OF THE INVENTION

The present invention relates generally to mobile communications and, more particularly, but not exclusively to determining implicit context data for shared media content associated with an event.

BACKGROUND OF THE INVENTION

Tremendous changes have been occurring in the Internet that influence our everyday lives. For example, online social networks have become the new meeting grounds. They have been called the new power lunch tables and new golf courses for business life in the U.S. Moreover, many people are using such online social networks to reconnect themselves to their friends, their neighborhood, their community, and to otherwise stay in touch.

The development of such online social networks touch countless aspects of our everyday lives, providing instant access to people of similar mindsets, and enabling us to form partnerships with more people in more ways than ever before.

One aspect of our everyday lives that may benefit from online social networking technology involves the aspect that social gatherings may often occur in a less than organized, impromptu fashion. For example, people may decide, online to get together at some restaurant, club, or the like, almost immediately. Some social gatherings, while known by some members of a social network may be unknown by others, until so informed that the social event is presenting occurring, or is about to occur.

Once at these events, people may wish to gather and share various media content associated with the event. Sharing of media content has become prevalent on mobile devices and has changed our everyday lives. Users are able to send and receive media content from a variety of mobile devices. However, managing of such shared media content by multiple people is sometimes difficult and confusing. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
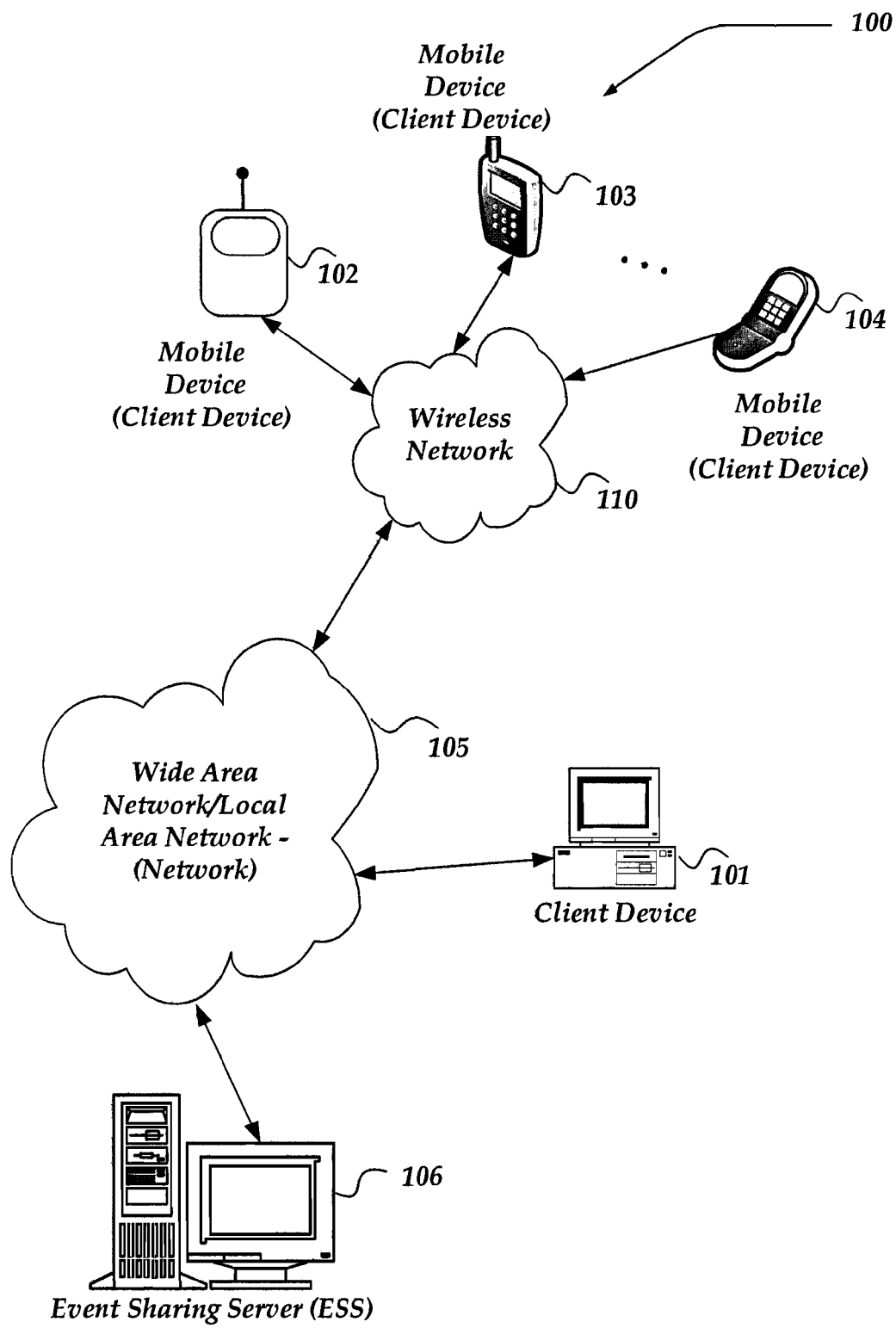
FIG. 1 is a system diagram of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "social network" and "social community" refer to a concept that an individual's personal network of friends, family colleagues, coworkers, and the subsequent connections within those networks, can be utilized to find more relevant connections for a variety of activities, including, but not limited to dating, job networking, service referrals, content sharing, like-minded individuals, activity partners, or the like. Such social network may be created based on a variety of criteria, including, for example, a social event, such as a party, meeting event, or the like.

As used herein, the term "event" refers to any social gathering of people, having a start time and an end time. In one embodiment, the start, and/or end times may be loosely established, in that they may occur informally, such as might arise based on an informal gathering of people. In another embodiment, the event may have established start and/or end times. Moreover, in one embodiment, the event may have multiple start/end times, such as might occur with a regularly scheduled meeting, or the like.

As used herein, the term "spontaneous event" refers to an event that arises from a momentary impulse, or similar impromptu action, rather than being planned. Thus, a spontaneous event may have either no formally announced start time, or a start time that is within a short period of time from the announcement of the event. This is unlike a planned event that has a defined start time that may occur hours or even days after an invitation to the event is sent to a potential participate to the event. Moreover, many planned events may include a defined end time. Often, planned events are announced with the announcement including a defined start and/or end time. However, because a spontaneous event may have a fuzzy or weakly defined start and/or end times, at least one of the times may not even be provided. For example, a spontaneous event may be where several people agree to meet around 5:00 PM for a drink, but had not formally planned the meeting until one of the potential participants suggested it during that day. Thus, while this example illustrates a fuzzy (around) start time, it may have no defined end time. Another example of a spontaneous event may be where a person sends a message to other people suggesting they meet at a party, or other event, that is currently transpiring, or is about to transpire. In this example, the start time may again be fuzzy, e.g., "let's get together at the party tonight." Again, this example also illustrates that no end time is typically announced for the spontaneous event. However, a spontaneous event may also occur within a planned event. For example, several people may 'get together' at a planned event, and 'start up' a spontaneous event, within the planned event.

As used herein, the term "media content" refers to any digital data directed towards a user of a computing device, including, but not limited to audio data, multimedia data, photographs, video data, still images, text, graphics, animation files, voice messages, text messages, or the like.

Briefly stated the present invention is directed towards determining a start and/or an end time for a spontaneous event. The invention enables people to create an online membership for the spontaneous event, and to share media content messages and/or other types of messages between the members during the spontaneous event. In one embodiment, the media content and/or other messages may be automatically posted to a website where the members may then annotate the spontaneous event.

The invention enables a mobile device user to create a group that includes one or more members for the spontaneous event. The user may then send the members an invite, or other message. During the spontaneous event, members may share media content messages and/or text messages with other members. In one embodiment, based, in part, on a flow of media content and/or text messages between the members, a start time and/or end time of the spontaneous event is automatically determined. In one embodiment, the start time may be based on when the group is created and then revised when a flow rate of the media content and/or messages exceed a threshold. However, other criteria may also be used to determine the start time, including, for example, when a media content message is first shared. In another embodiment, a start time may also be determined by searching content of a text message for time information, or the like. In one embodiment, the end time may be based on the flow rate of shared messages between the members being less than another threshold. For example, in one embodiment, if the rate of messages being shared indicates no messages have been shared between members for a determined amount of time, then a time that the last message was shared, may be used to indicate the end time. In another embodiment, the end time may be determined based on a time when the rate of flow of messages being shared was less than some number of messages per some unit of time, or the like. The location of the spontaneous event may also be determined based on a physical location of the members' mobile devices during the event. In addition, in one embodiment, other implicit information may also be determined that indicates whether a member to the group participated in the event by sending media content or other messages to other members of the group during the spontaneous event.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, Event Sharing Server (ESS) 106, mobile devices (client devices) 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to ESS 106, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as ESS 106, client device 101, each other, or the like. However, the present invention is not limited to these message protocols, and virtually any other message protocol may be employed. For example, the client application may enable a user to interact with the browser application, email application, VOIP applications, or the like.

Mobile devices 102-104 may further be configured to include a client application that enables the end-user to log into an end-user account that may be managed by another computing device, such as ESS 106. Such end-user account, for example, may be configured to enable the end-user to receive emails, send/receive IM messages, SMS messages, access selected web pages, participate in a social networking event, or the like. However, participation in various social networking events may also be performed without logging into the end-user account.

In addition, mobile devices 102-104 may include another application that is configured to enable the mobile user to share and/or receive media content, and to display the media content. In one embodiment, each of mobile devices 102-104 may share with and/or receive the media content from ESS 106 and/or from another one of mobile devices 102-104. For example, media content may be shared between the mobile devices using MMS, WAP, or the like. In one embodiment, a mobile device may receive a message indicating the media content is available for viewing and/or annotating at a website, or the like.

Figure 6:
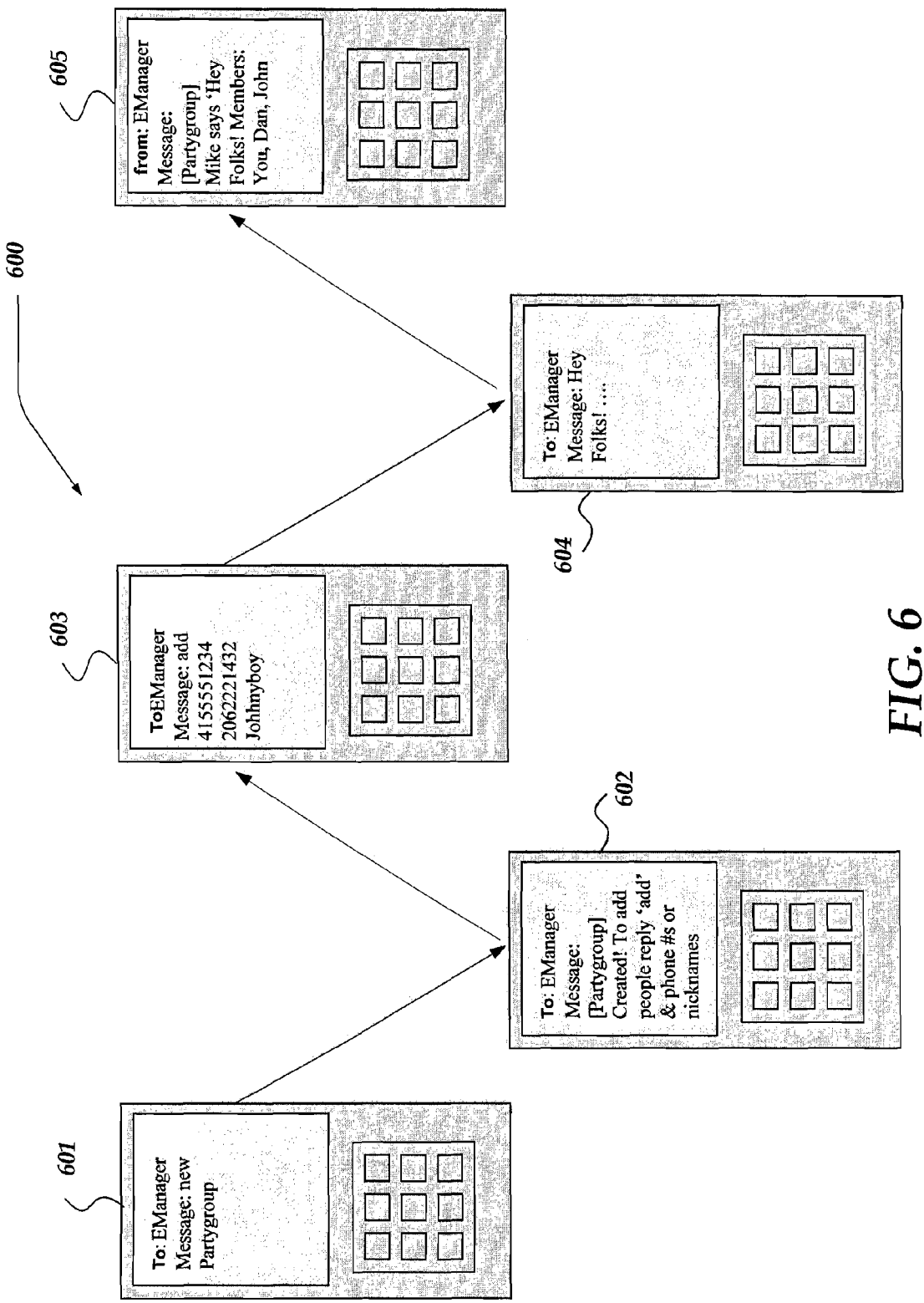
FIG. 6 shows one embodiment of a use case illustrating creating of an event.
Figure 7:
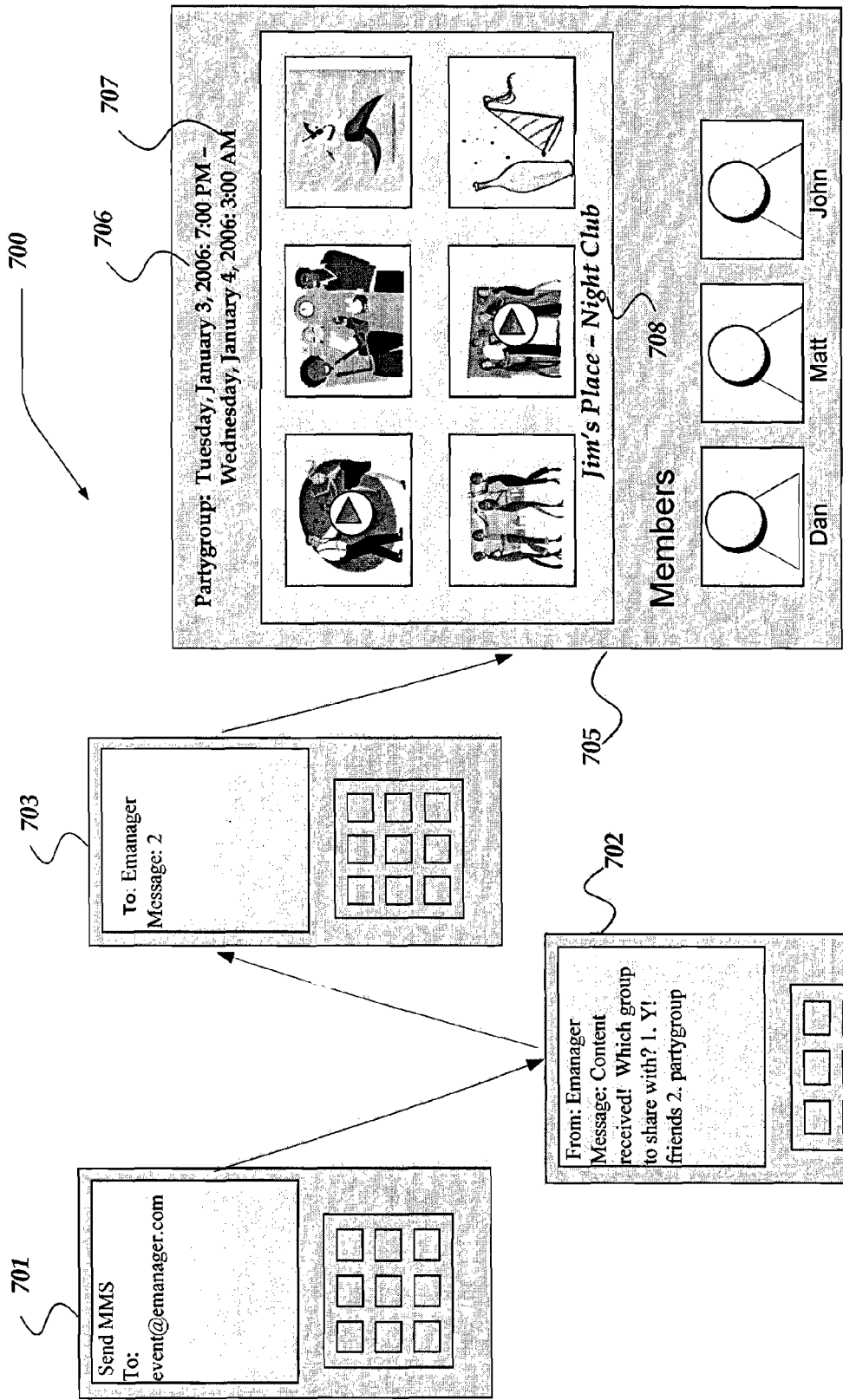
FIG. 7 shows one embodiment of a use case illustrating sharing of media content for the event, in accordance with the present invention.

In conjunction with sharing media content, mobile devices 102-104 may enable an interaction with each other, through sharing various messages, and generally participating in a variety of integrated social experiences beyond merely voice communications. In one embodiment, mobile devices 102-104 may enable the interaction with a user associated with a spontaneous event. For example, a user of one of mobile devices 102-104 may create a group that includes identified members, and send a message to the members regarding the event. In one embodiment, members of the group may then elect to share media content, such as photographs, video clips, audio clips, text messages, emails, or the like, with other members of the group. Moreover, mobile devices 102-104 may enable any of the members of the group to also add other members to the group. FIGS. 6-7 below include one embodiment of examples of a group creation, and sharing of media content.

Mobile devices 102-104 may also communicate with non-mobile client devices, such as client device 101, or the like. In one embodiment, such communications may include providing information about the shared media to a user of client device 101, or the like.

Client device 101 may include virtually any computing device capable of communicating over a network to send and receive information, including social networking information, or the like. The set of such devices may include devices that typically connect using a wired or wireless communications medium such as personal computers, multiprocessor systems, microprocessor-based or programmable consumer electronics, network PCs, or the like. In one embodiment, client device 101 may be configured to access a website, or other location, of shared media content, and to annotate the media content, add additional media content, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like.

Network 105 is configured to couple ESS 106 and its components with other computing devices, including, mobile devices 102-104, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between ESS 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of ESS 106 is described in more detail below in conjunction with FIG. 3. Briefly, however, ESS 106 may include any computing device capable of connecting to network 105 to enable creation of a spontaneous event group and for the sharing of media content with the members of the group. ESS 106 may receive from various participants in the event, media content, and other social networking information, including information associated with event, messages, or the like. ESS 106 may then employ any of a variety of communication services to enable the messages to be shared between the members of the group. Moreover, ESS 106 may enable a website or other location for storage and access of at least some of the shared messages. ESS 106 further enables members of the group to add more members to the group, even if the member adding is not the original creator of the group.

ESS 106 may also enable members of the group to provide annotation to the event, and/or media content associated with the event. In one embodiment, ESS 106 may provide a user interface, such as pull down menus, forms, scripts, or the like, to enable a member to access event information, and to provide annotations to various components associated with the event. For example, ESS 106 may enable a member to select a photograph, audio clip, or other media content, using the user interface, and to associate text, or other content to the selected item. Moreover, the user may also be enabled by ESS 106 to provide various other metadata to the event, such as a title of the event, a location of the event, information about additional participants to the event, an avatar, or the like.

ESS 106 may be configured to further determine a start and/or an end time for the event. In one embodiment, the start time and/or end time of the event may be automatically determined based, in part, on a flow of media content and/or text messages between the members. In one embodiment, the start time may be based on when the group is created and then may be revised when a flow rate of the media content and/or messages exceed a threshold. In another embodiment, the start time may be determined by searching content of a text message for time information, or the like. In one embodiment, the end time may be based on the flow rate of shared messages between the members being less than another threshold. In another embodiment, the end time may be determined based on a time when the rate of flow of messages being shared is less than some number per hour, or the like. ESS 106 may employ a process similar to that described below in conjunction with FIG. 5 to perform at least some of its actions.

Devices that may operate as ESS 106 include personal computers desktop computers, multiprocessor systems, microprocessor-based or programmable consumer electronics, network PCs, servers, and the like.

Although FIG. 1 illustrates ESS 106 as a single computing device, the invention is not so limited. For example, one or more functions of ESS 106 may be distributed across one or more distinct computing devices. For example, managing various social networking events, including sharing of media content, managing Instant Messaging (IM) session, SMS messages, email messages, posting of media content, determining implicit information such as start/end times, locations, or the like for an event, may be performed by a plurality of computing devices, without departing from the scope or spirit of the present invention.

Illustrative Mobile Client Environment

Figure 2:
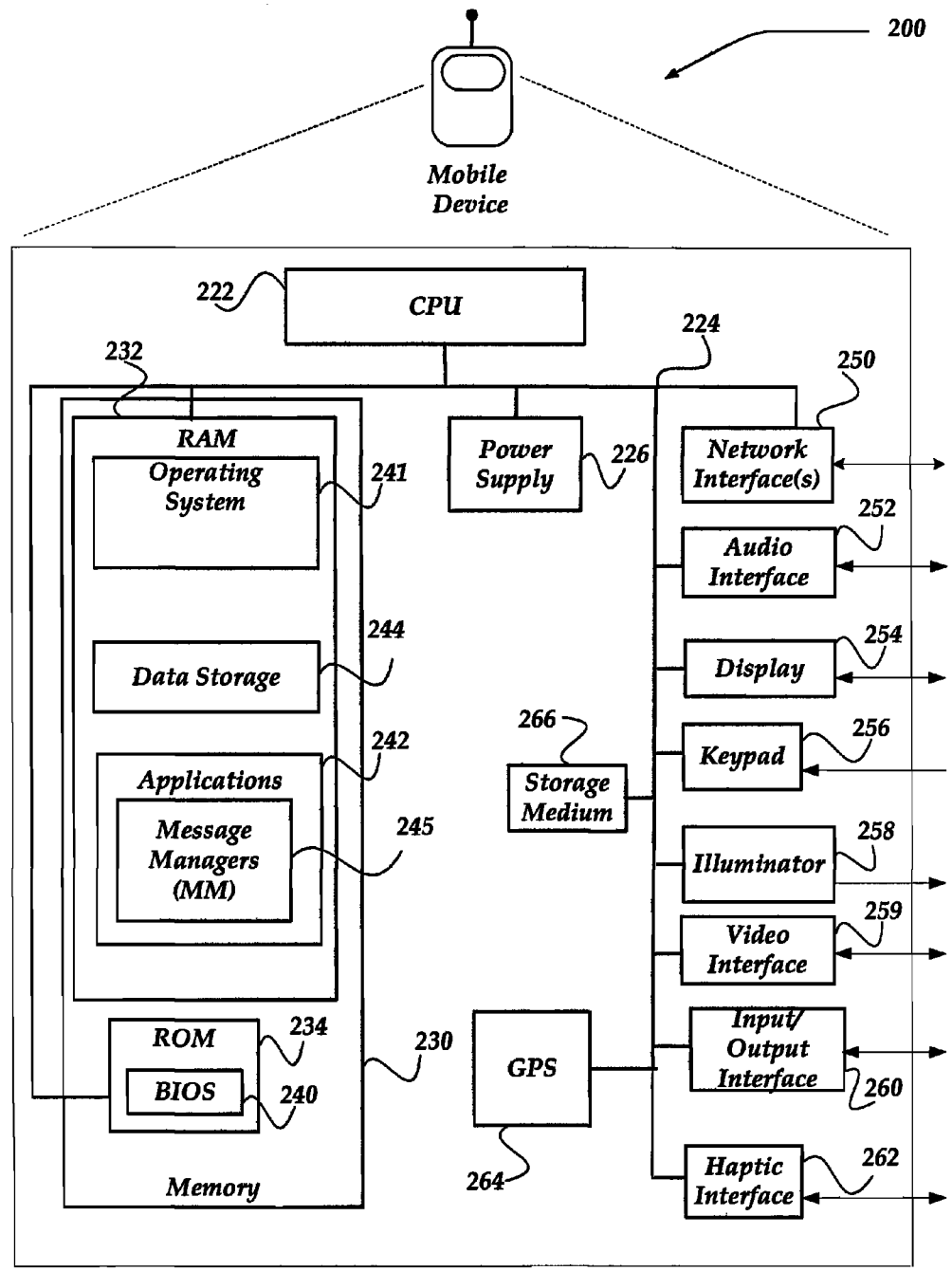
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store media content and/or social networking information including text messages, address books, group member list, or the like. At least a portion of the media content and/or event information may also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth. Applications 242 may further include Message Managers (MM) 245.

MM 245 represents any of a variety of applications configured to transmit, receive, and/or otherwise process messages and other network content, including, but not limited to SMS, MMS, IM, email, VOIP, browsers, or the like, and to enable telecommunication with another user of another networked device. For example, MM 245 may include any of a variety of browser applications, which may be run under control of operating system 241 to enable and manage requesting, receiving, and rendering markup pages such as WAP pages (sometimes referred to as WAP cards), SMGL, HTML, HDML, WML, WMLScript, JavaScript, and the like.

MM 245 may further include an IM application that is configured to initiate and otherwise manage an instant messaging session, including, but not limited to AOL Instant Messenger, Yahoo! Messenger, .NET Messenger Server, ICQ, and the like. In one embodiment, the IM application within MM 245 may be configured to employ a SIP/RTP to integrate IM/VOIP features. For example, the IM application may employ SIMPLE (SIP for Instant Messaging and Presence Leverage), APEX (Application Exchange), Prim (Presence and Instant Messaging Protocol), Open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

MM 245 may also include text messaging application(s) that enables mobile device 200 to receive and/or send text messages to another device. In one embodiment, the text messaging application(s) may also provide an alerting mechanism that indicates to a user of mobile device 200 when a text message is received. The text messaging application(s) may also allow the user to compose a text response message, and to send the text response message over a network. The text messaging application(s) may operate to manage SMS text messages, MMS messages, Enhanced Message Service (EMS) messages, or the like, where graphics, video clips, sound files, or other media content may be communicated between mobile device 200 and another networked device.

In any event, any one or more of the messaging applications within MM 245 may be employed to enable a user of mobile device 200 to create a group with members for an event, to share media content, and other messages with members of the group, add to access media content or the like, from another networked device, such as a website, server, or the like. In one embodiment, MM 245 may enable a user to send SMS messages, and/or send/receive MMS messages, where the messages may include media content, a link to a remote server where the media content is stored, or the like. MM 245 may employ interfaces such as those described below in conjunction with FIGS. 6-7 to perform at least some of its actions. Moreover, mobile device 200 may employ a process such as described below in conjunction with FIG. 4 to perform at least some of its actions.

Illustrative Server Environment

Figure 3:
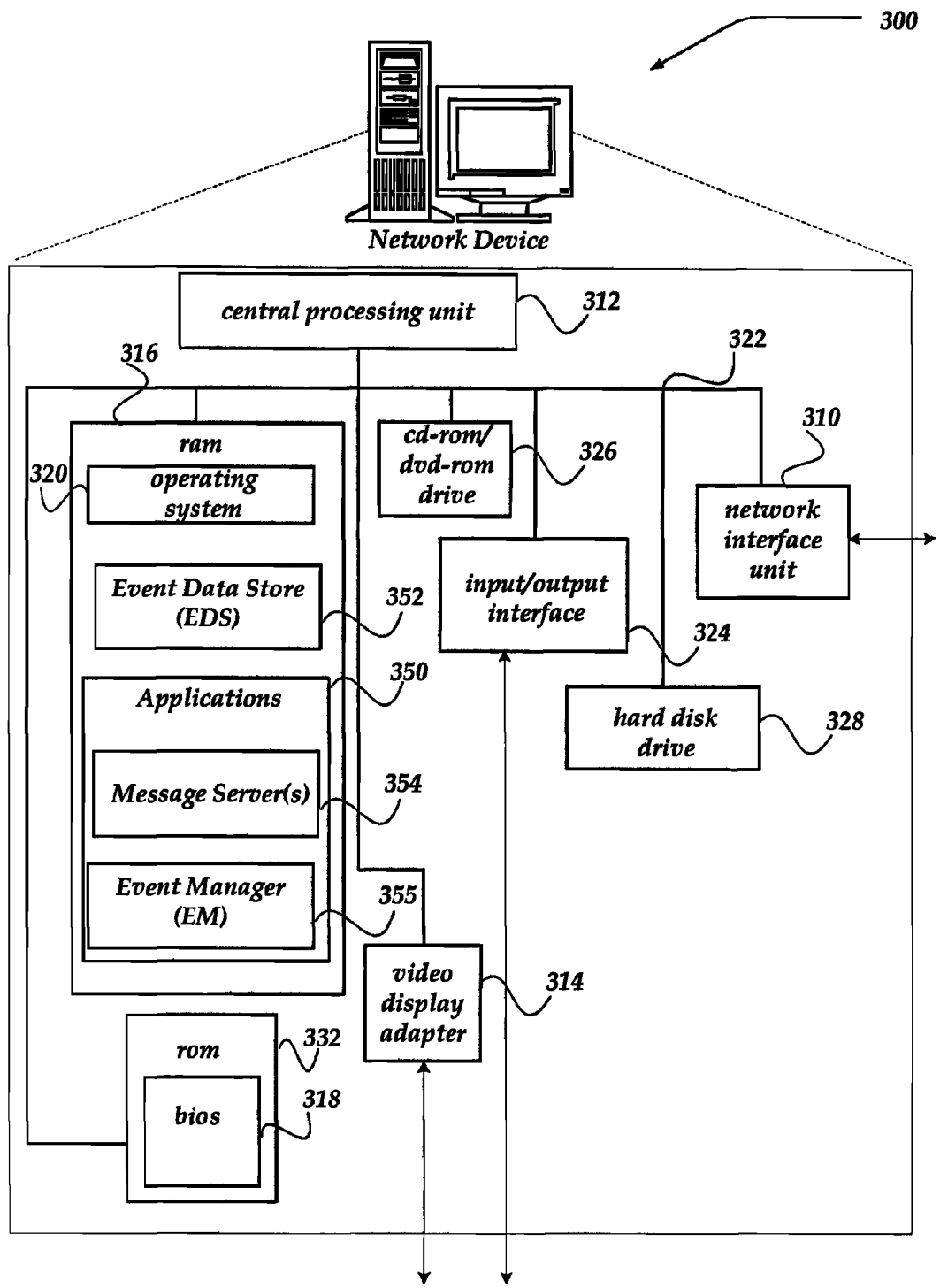
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, ESS 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, account management, and so forth. Event Manager (EM) 355 and/or Message Servers 354 may also be included as application programs within applications 350.

Event Data Store (EDS) 352 stores a plurality of received media content. In one embodiment, EDS 352 may be a database, a file structure, or the like. EDS 352 may store the media content into a category structure, such as folders, albums, graphs, trees, or the like, based, in part, on events, times associated with an event, or the like. In one embodiment, because some events may occur on a schedule, such as periodically, or the like, media content may also be categorized based on event schedules, or the like. Moreover, the media content may be stored using any of a variety of data formats. In one embodiment, media content within EDS 352 may be accessed for use in displaying over a network. For example, the media content may be accessed via a hyperlink or the like, from a web server, using a mobile device, or the like.

EDS 352 may also be configured to store information associated with group membership. Thus, in one embodiment, EDS 352 may receive and store identification information for a member to a group. Such identification information may include a name, a phone number, a network address, or the like.

Message server(s) 354 include virtually any communication server that may be configured to enable communications between networked devices, including email servers, SMS servers, various text messaging servers, VOIP servers, IM servers, MMS servers, RSS servers, audio servers, web servers, or the like. Message server(s) 354 may employ EDS 352 to store or otherwise manage media content that may be communicated over a network. In one embodiment, various message server(s) 354 may receive a message from one network device, and, in conjunction with Event Manager (EM) 355, employ information about group membership to store, and/or share the media content to other members over the network. In one embodiment, message server(s) 354, in conjunction with EM 355, store received media content for a group, within EDS 352.

EM 355 is configured to manage events, including spontaneous events. As such, EM 355 may receive from message server(s) 354 a request for creation, deletion, or modification of a group for an event. EM 355 may employ EDS 352, to create and otherwise manage the membership to the group. EM 355 may further employ various message server(s) 354 to send a message to the members of the group indicating that they are a member to the group.

While message server(s) 354 may be configured to manage and enable sharing of messages, including messages having media content, EM 355 may employ the messages, and related information to determine implicit information about an event. Thus, EM 355 may determine start times, end times, locations of an event, or the like. EM 355 may, in one embodiment, enable the implicit information to be accessed using at least one of the message server(s) 354. Furthermore, EM 355 may provide a user interface for use, in conjunction with various message server(s) 354 to annotate an event, and/or media content within an event at a website, or other location. EM 355 may employ a process such as described below in conjunction with FIG. 5 to perform at least some of its actions.

Generalized Operation

Figure 4:
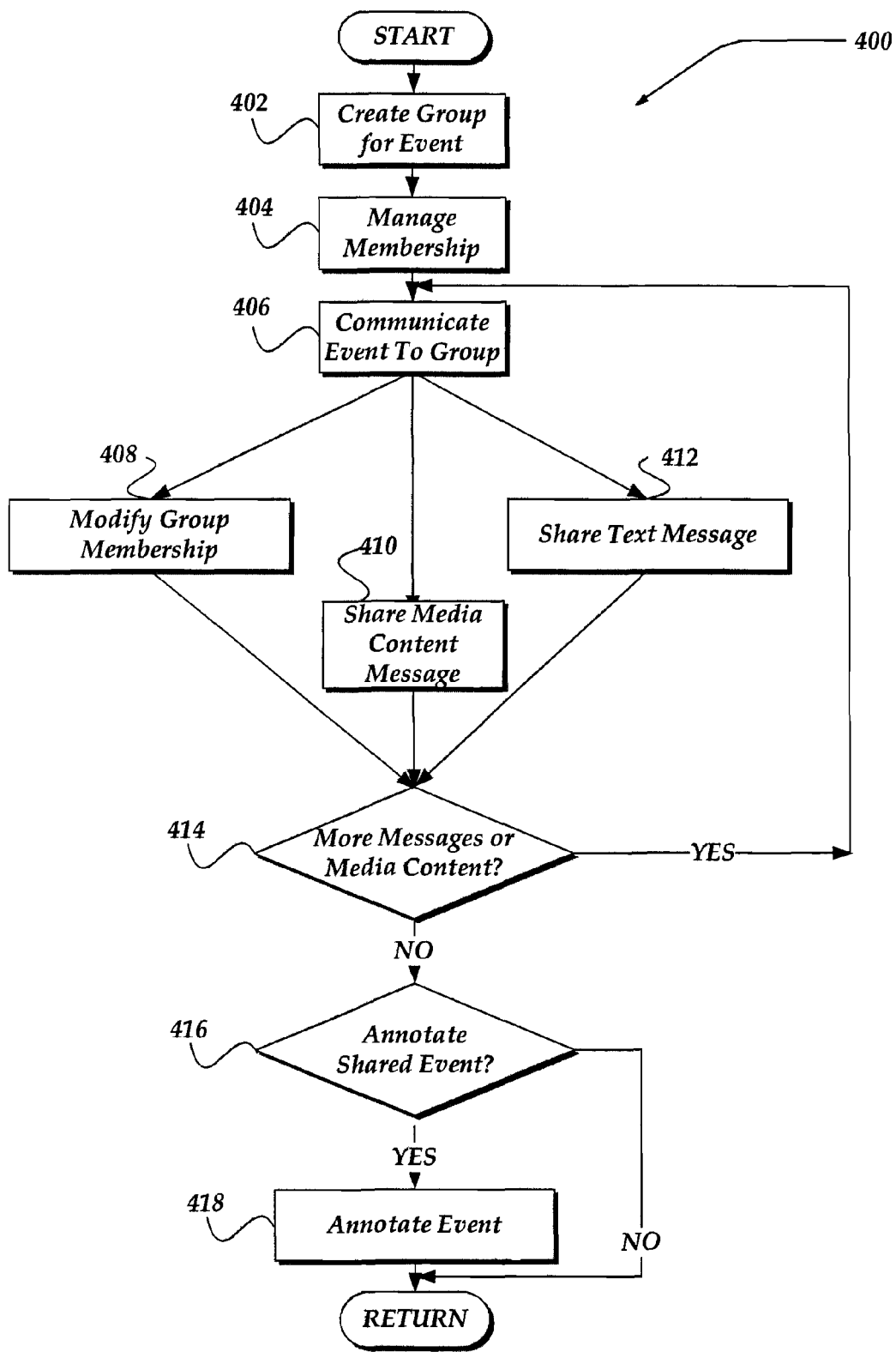
FIG. 4 illustrates a logical flow diagram generally showing one embodiment of a process for creating an event for sharing of media content.
Figure 5:
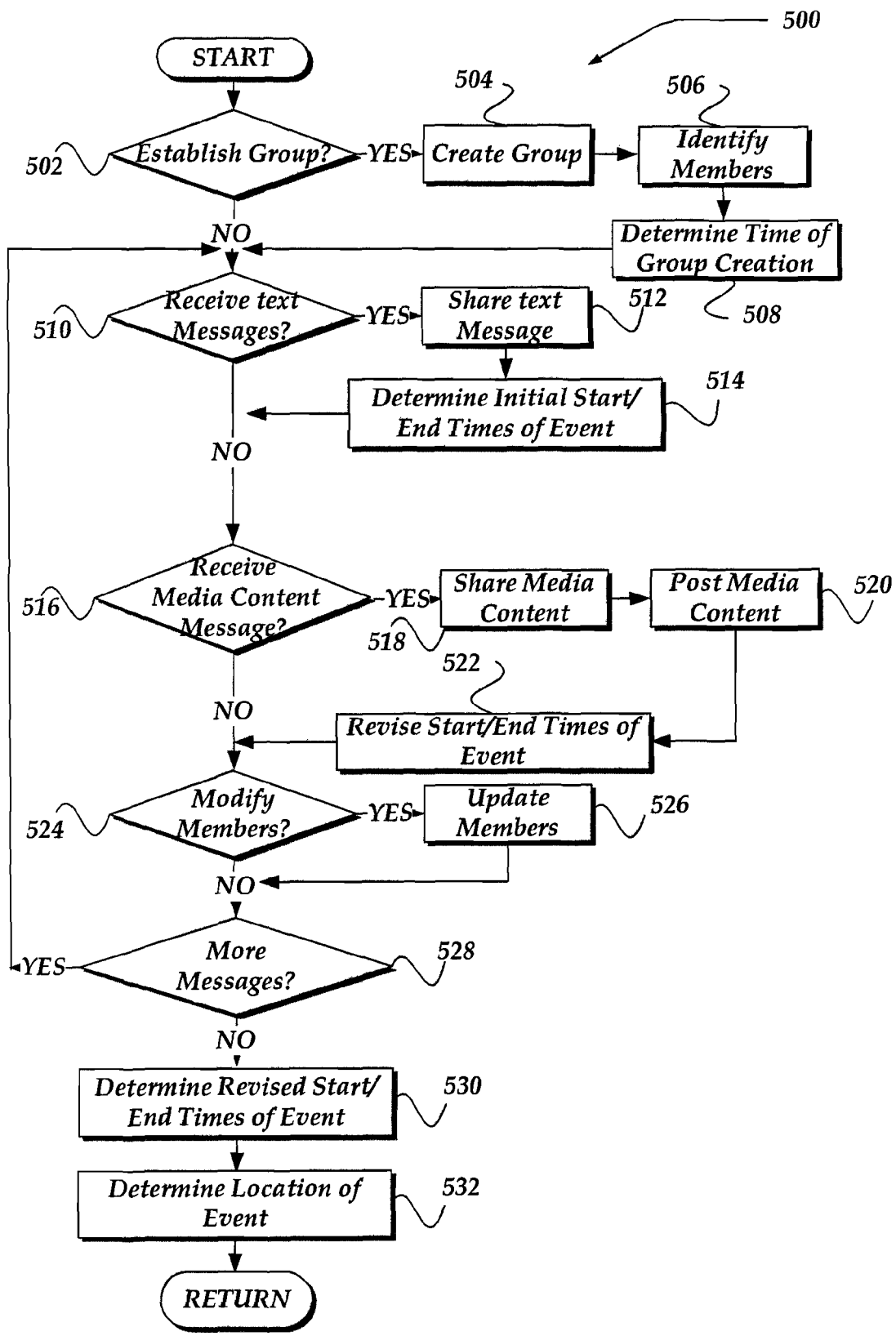
FIG. 5 illustrates another logical flow diagram generally showing one embodiment of a process for determining implicit information associated with the event based, in part, on the shared media content.

The operation of certain aspects of the invention will now be described with respect to FIGS. 4-5. FIGS. 4-5 provide logical flow diagrams of certain aspects, while FIGS. 6-7 provide use case examples to further illustrate the invention.

FIG. 4 illustrates a logical flow diagram generally showing one embodiment of a process for creating an event for sharing of multimedia content. As shown, process 400 of FIG. 4 may be performed using any of mobile devices 102-104 of FIG. 1. Moreover, in one embodiment, at least some of the block of process 400 may occur during an event.

Process 400 begins, after a start block, at block 402, where a user of a mobile device creates a group. Referring to example 600 of FIG. 6, interface 601 illustrates that, in one embodiment, a message may be sent to an event manager service, such as EM 355 of FIG. 3, or the like. The message may, in one embodiment, employ SMS, however, the invention is not so limited, and any of a variety of communication message services may also be employed. As shown in FIG. 6, the message may request a "new" group to be created by the name "partygroup." In one embodiment, a first time user of the event manager service may also be requested to register. Such registration, may, for example, include a click through agreement regarding terms of service, privacy rights, or the like. In one embodiment, the click through agreement may be accessible at a remote server, using a hyperlink, or the like.

Returning to process 400, the process flows next to block 404, where the user of the mobile device may be asked for and/or enter identifications for members to the group. Referring briefly to FIG. 6, interfaces 602 and 603 illustrate embodiments of possible communications that might transpire during block 404.

Processing then continues to block 406, where the user may then select to send one or more messages to the members of the group. Examples of this are shown with interfaces 605 and 605 of FIG. 6. Process 400 may then flow to block 408, 410, and/or block 412.

At block 408, the user that created the group or any of the members to the group may modify the group membership. That is, anytime during an event, a member of the group may enter an identification of another person, to enable that other person to join the group and share messages about the event. Processing then loops to decision block 414.

At block 410, any member of the group may share media content with other members of the group during the event. For example, during the event, a member may take a photograph, record a video clip, audio clip, or obtain a variety of other media content. The member may then, using, for example, MMS, or another messaging service, send the media content to the event manager service to be shared. One example of such sharing is illustrated in FIG. 7, by interfaces 701-703. As shown, in one embodiment, where a user may be a member to multiple groups, the user may be asked with which group the media content is to be shared. However, in one embodiment, once selected, additional media content may be directed to the same group, until the user selects another group, or the termination of the event based on a determination of the end time of the event, or based on a variety of other actions. Also shown in FIG. 7 is one example illustrating that the media content may be sent to the other members of the group using a variety of mechanism, including, for example, MMS, or the like. In one embodiment, a message might be sent to another member of the group as an SMS message that includes a hyperlink to a server where the media content may be accessed. Moreover, in one embodiment, the media content may be sent to members using a messaging service based, in part, on a capability of their mobile device. Thus, for example, it may be determined, using, for example, information provided about the members' mobile devices, that one mobile device is capable of receiving media content using MMS, WAP, email, or the like, while another mobile device may only employ SMS. In any event, media content may be shared during the event, at block 410 of FIG. 4. Process 400 may then flow to decision block 414.

At block 412, other types of messages may also be communicated to members of the group, using a variety of other text messaging services, email services, or the like. Such messages may be received and distributed to the members of the group during the event. Processing then flows to decision block 414.

At decision block 414, a determination is made whether there are more messages, media content, and/or changes to the membership for this event. If so, processing may loop back to block 406 to continue until there are no more messages, media content, or changes to the membership. This looping may occur during the event, but may occur for some period of time after the event has actually ended. For example, in some instances, a member may have taken several photographs, video clips, or the like, and selected to share them shortly after the event is actually ended. Determination of the end of the event then may be based on a variety of criteria, including those described below in conjunction with FIG. 5. Briefly, however, if it is determined that no more of messages or changes are received, processing flows to decision block 416.

At decision block 416, a determination is made whether the shared event is to be annotated. If the shared event is to be annotated, processing flows to block 418; otherwise, processing may return to a calling process to perform other actions.

At block 418, in one embodiment, the user may employ their mobile device, or other computing device, with a browser interface to select the event. In one embodiment, the media content may be displayed, in a format, suitable to the mobile device, or other computing device, such that the user may then select and/or annotate media content, and/or the event itself. Referring briefly to FIG. 7, interface 705 shows one embodiment of a website interface for displaying event information including media content. The user may then employ various mechanisms, including menus, pointers, forms, text boxes, or the like, to select and provide annotation.

FIG. 5 illustrates another logical flow diagram generally showing one embodiment of a process for determining implicit information associated with the event based, in part, on the shared multimedia content. Process 500 of FIG. 5 may be implemented, for example, within ESS 106 of FIG. 1.

Process 500 begins, after a start block, at decision block 502, where a determination is made whether to establish a new group or work with an existing group. If a new group is to be established, processing flows to block 504; otherwise, processing proceeds to decision block 510.

At block 504, a request to create a new group is received. In one embodiment, a candidate name for the group may be provided by a mobile device user. In one embodiment, if the candidate name already exists, the user may be requested to select another name. In one embodiment, however, duplication of group names may be managed based on a membership. Thus, in one embodiment, if the user is not a member of a group having the provided name, then the group may be created with that name, even if the group name already exists independent of the creator. Thus, in one embodiment, groups may be uniquely identified within process 500 based on a creator's identification and the provided group name. In any event, processing then continues to block 506, where identifiers for members to the group are received. Such identifiers may include email addresses, SMS addresses, IM addresses, phone numbers, or any of a variety of other identifiers. Processing continues next to block 508, where a time that the group is created is recorded. In one embodiment, the time the group is created may be employed as an initial start time for an event associated with the group. Processing then flows to decision block 510.

At decision block 510, a determination is made whether a text message is received from one or more members of the group. The text message may be received over SMS, IM, email, MMS, or the like. If a text message is received, processing flows to block 512; otherwise, processing continues to decision block 516.

At block 512, the received text message may be shared (e.g., distributed) to the other members of the group, using any of a variety of messaging services, including the same messaging service employed with the received text message. Process 500 continues to block 514 where, in one embodiment, an initial start time and/or end time for the event associated with the group may be determined. For example, in one embodiment, a time when a first text message is received for sharing with the group may be used to determine the start time of the event associated with the group. In one embodiment, the contents of the text message may searched for keywords, such as a time, date, or the like. If such keywords are identified in the message, they may be employed, in part, to determine the start and/or end time of the event. In another embodiment, information about a physical location of the mobile device used to send the text message may be obtained and employed to determine a location of the event. Processing flows next to decision block 516.

At decision block 516, a determination is made whether a message is received that includes media content. If so, processing flows to block 518; otherwise, processing continues to decision block 524. At block 518, the received media content may be shared (e.g., distributed) to the other members of the group. In one embodiment, the media content may be shared using a different messaging service than the media content was received. Processing then moves to block 520, where the media content may be automatically posted to a server, such as a website, or the like, where it is associated with the event. In one embodiment, sharing of the media content at block 518 may include providing a hyperlink, or other access mechanism, to the posted location of the media content. Processing then flows to block 522, where the start and/or end time of the event may be revised. It is anticipated that as an event transpires more messages may be shared, often with an increase in a flow rate (e.g., rate of sharing) of the messages during the event. Thus, in one embodiment, a few text messages and/or messages having media content may be shared near a beginning of an event. However, as the event continues, it is anticipated that the rate of sharing of the messages between members increases. As the event nears an end, it is further anticipated that the rate of sharing of messages decreases. At some point, the messages may cease, or decrease to a very low flow rate. Thus, in determining a revised start time for an event, various criteria may be employed. For example, in one embodiment, when the flow rate of messages exceeds some threshold value, such as two/minute, five/minute, or the like, then it might be determined that the event has started. However, it should be clear that other values may also be selected, without departing from the scope of the invention. Moreover, in one embodiment, the start time may also be determined based, for example, on receiving a first message with media content.

Similarly, the end time may also be inferred from the flow rate of messages. Thus, in one embodiment, when the flow rate of messages, or just media content messages, or the like, drops below another threshold value, that time, might be determined to be the end time for the event. For example, if no media content messages or text messages are received over a two hour period of time, 12 hour period of time, or the like, then the end time might be determined to be that time when the last message was received, or based on an offset time from that time.

Moreover, during the sharing of media content messages, physical locations of the mobile devices associated with sending of the message to be shared may also be obtained. In one embodiment, if it is determined that several of the mobile devices sharing messages are within some determined distance apart, then those locations may be used to determine a location of the event. Thus, in one embodiment, a location central to the locations of the mobile devices may be used to determine the event location. In another embodiment, the locations of the mobile devices may be used to search a data store, such as a merchant directory, white pages, maps, or the like, to identify a facility, business, park, theater, home, or the like. The location of the facility may then be employed to identify a location of the event. However, the invention is not limited to these techniques to determine a location of the event, and virtually any other mechanism may be employed. For example, in one embodiment, the shared messages may be searched for keywords that might indicate a location. In any event, processing then proceeds to decision block 524.

At decision block 524, a determination is made whether a request is received to modify the membership of the group. Such requests may be received from the creator of the group, or even from any one or more of the members of the group. In any event, if a request is received, processing proceeds to block 526 where the membership is modified. Processing then flows to decision block 528. If no such request is received processing also flows to decision block 528.

At decision block 528 a determination is made whether more messages are received for this group's event. In one embodiment, such determination may be made based on a flow rate of shared messages being below some threshold. Thus, for example, if no messages are received for some period of time, then it might be determined that the event is ended, and processing flows to block 530. Although subsequent messages may be received, days or even weeks after an end of an event, decision block 528 determines an end of an event based on some implicit information obtainable from the sharing of the messages, as described above. Thus, if more messages are received based on the selected criteria, then processing loops back to decision block 510, where it is anticipated that the event is currently transpiring, and more messages are to be shared, or are being shared.

At block 530, the start and/or end times for the event may be revised using any of a variety of mechanisms, including those described above. In one embodiment, the determined start and/or end times may be sent to a website for annotation of the event, such as illustrated in FIG. 7 with start time 706 and end time 707.

Processing then flows to block 532, where the location of the event may be revised based on any of a variety of mechanisms, including those described above. In one embodiment, the determined location may be provided to a website for annotation of the event, such as illustrated in FIG. 7 with place 708.

Moreover, in one embodiment, a variety of other implicit information may also be determined based on the sharing of messages during the event. For example, in one embodiment, it might be determined based on some low level of messages sent from one member, and/or a physical location of that member's mobile device, that that member did not attend the event. In another embodiment, such information may also be employed to indicate that that member was present at the event, but selected not to send messages. Such information may also be recorded, and/or made available for annotation of the event, determination of future event members, or any of a variety of other uses. In any event, processing may then return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A server device to manage a mobile communication, comprising:
a transceiver to send and receive data over a network; and
a processor that is operative to perform actions, comprising:
creating a group associated with a spontaneous event, wherein the spontaneous event comprises a gathering of people in a physical location;
receiving a membership to the spontaneous event, wherein each member is associated with a mobile device;
receiving at least one text message or media content message during the spontaneous event;
distributing to each member's mobile device the at least one text message or media content message during the spontaneous event, and further posting at least the media content message to a website associated with the spontaneous event;
determining an initial start time and an end time associated with the spontaneous event, based on receiving the at least text message or media content message; and
determining a revised start time as when a flow rate of messages shared between members of the group exceeds, a threshold during the spontaneous event, wherein the messages shared between members includes messages received from one member of the group that are distributed to other members of the group.

2. The server device of claim 1, wherein determining the initial start time of the spontaneous event further comprises:
determining the initial start time based on at least one of when the first message is received or when the group is created; and
revising the initial start time based on at least data extracted from at least one text message.

3. The server device of claim 1, wherein determining the end time of the spontaneous event further comprises:
determining the end time based on receiving less than a threshold of messages over a period of time.

4. The server device of claim 1, wherein the processor is operative to perform actions, further comprising:
determining a physical location of the spontaneous event based on a location of at least one mobile device during the spontaneous event, or from data within the at least one text message; and
posting of the physical location at the website.

5. The server device of claim 1, wherein the processor is operative to perform actions, further comprising:
receiving, from a member, information about the spontaneous event, after the end or the spontaneous event; and
posting the information at the website, wherein the information about the spontaneous event is organized based, in part, on the start or end time of the spontaneous event.

6. A computer-readable storage medium having computer-executable instructions for sharing of event information over a network, the computer-executable instructions when installed onto a computing device enable the computing device to perform actions comprising:
creating a group associated with a spontaneous event, wherein the spontaneous event comprises a gathering of people in a physical location;
receiving a membership to the spontaneous event, wherein each member is associated with a mobile device;
receiving at least one text message or media content message during the spontaneous event;
distributing to each member's mobile device the at least one text message or media content message during the spontaneous event;
determining an initial start time and an end time associated with the spontaneous event, based on receiving the at least one text message or media content message; and
determining a revised start time as when a rate of sharing of messages exceeds a threshold during, the spontaneous even, wherein the sharing of messages includes messages received from one member of the group that are distributed to other members of the group.

7. The computer-readable storage medium of claim 6, wherein determining the end time further comprises determining the end time based on a rate of sharing of messages being less than a threshold, wherein the end time is determined to be alter the start time.

8. A mobile device for sharing information, comprising:
a memory component for storing data; and
a processing component for executing data that enables actions, comprising:
creating a membership group to a spontaneous event of a gathering of people in a physical location;
sharing, during the event, at least one of media content or text message to at least one other mobile device associated with a member of the group, wherein sharing or the media content further comprises enabling automatic posting of the media content to a website associated with the event independent of further actions by the mobile device;
enabling a determination of an initial start time or an end time of the spontaneous event based on the sharing of the at least one media content or text message; and
determining a revised start time as when a rate of sharing of messages exceeds a threshold during the spontaneous event, wherein the sharing of messages includes messages received from one member of the group that are distributed to other members of the group.

9. The mobile device of claim 8, wherein enabling a determination of an end time further comprises determining the end time based on a time associated with receiving a last message, wherein the last message is determined based on receiving no messages for a threshold period of time for the group.

10. The mobile device of claim 8, wherein the actions further comprise:
enabling a determination of a location of the event based on providing a physical location of the mobile device during sharing of messages associated with the event.

11. The mobile device of claim 8, wherein sharing of the media content further comprises sending the media content using. Multimedia Messaging Service (MMS).

12. The mobile device of claim 8, wherein enabling a determination of an initial start time further comprises:
determining the initial start time for the spontaneous event based on at least one of sharing of a first message with the members, when the membership is created, when a number of media content messages is shared that exceeds a threshold value, or data within the text message.

13. The mobile device of claim 8, wherein sharing the media content further comprises automatically annotating the media content based at least in part on a physical location of the mobile device, a time, an identity of member of the group.

14. A method for managing a mobile communication, comprising:
- establishing a group associated with a spontaneous event, wherein each member of the group is associated with a mobile device, the spontaneous event being a gathering of people in a physical location;
- sharing among the group during, the spontaneous event at least one of a text message or media content message using at least one of the mobile devices;
- determining an initial start time and an end time associated with the spontaneous event, based on the sharing of the text message or media content message; and
- determining a revised start time as when a rate of sharing of messages exceeds a threshold during the event, wherein the sharing of messages includes messages received from one member of the group that are distributed to other members of the group.

15. The method of claim 14, further comprising:
modifying the membership to the group during .the spontaneous event.

16. The method of claim 14, wherein determining the end time is based on receiving less than a threshold of messages over a period of time.

17. The method of claim 14, wherein determining the initial start time is based on at least one of when the first, message is received or when the group, is created or based on data extracted from at least one text message.

18. The method of claim 14, wherein sharing the media content message further comprises sending to each member's mobile device at least one of the media content or a link to a location at a server where the media content is accessible.

19. A computer-readable storage medium configured to include program instructions for performing the method of claim 14.

20. An apparatus to manage a mobile communication, comprising:
- a transceiver to send and receive data over a network;
- means for communicating an occurrence of an event of a gathering of people in a physical location;
- means for sharing messages, including media content, during the event;
- means for determining an initial start time and an end time of the event based, in part, on a flow of the shared messages during the event; and
- means for determining a revised start time based on sharing of messages at a flow rate above a threshold during the event, wherein the sharing of messages includes messages received from one member of a group that are distributed to other members of the group.

21. The apparatus of claim 20, wherein the means for determining the initial start time and the end time further comprises:
- means for determining the end time based on sharing of messages at a flow rate below second threshold after sharing messages at a flow rate above the threshold.

* * * * *